US009691249B1

(12) United States Patent
Keys

(10) Patent No.: US 9,691,249 B1
(45) Date of Patent: Jun. 27, 2017

(54) VEHICULAR CHILD OR PET ALARM

(71) Applicant: Kenny Keys, Delray Beach, FL (US)

(72) Inventor: Kenny Keys, Delray Beach, FL (US)

(*) Notice: Subject to any disclaimer, the term of this patent is extended or adjusted under 35 U.S.C. 154(b) by 0 days.

(21) Appl. No.: 15/019,456

(22) Filed: Feb. 9, 2016

(51) Int. Cl.
*B60Q 1/00* (2006.01)
*G08B 21/02* (2006.01)
*B60Q 9/00* (2006.01)

(52) U.S. Cl.
CPC ........... *G08B 21/0205* (2013.01); *B60Q 9/00* (2013.01)

(58) Field of Classification Search
CPC ............ B60N 2/002; B60N 2002/2815; B60N 2/2839; B64C 13/20; B64C 11/001; B64D 2045/0035; B64D 2045/0045; B64D 2045/0055; B64D 45/0015; B64D 2027/026; B64D 27/24; G07C 5/008; G08B 13/1965
USPC ......... 340/457, 539.13, 426.25, 988, 539.26, 340/539.1, 463, 538.15, 686.6
See application file for complete search history.

(56) References Cited

U.S. PATENT DOCUMENTS

D441,524 S 5/2001 Shimizu
6,924,742 B2 8/2005 Mesina
8,038,213 B2 10/2011 Owens
9,030,313 B1 5/2015 Pearson
2002/0101366 A1* 8/2002 Flick ........................ B60R 25/04 340/988
2003/0122662 A1 7/2003 Quinonez
2007/0188321 A1* 8/2007 Stenlund ............. B60R 25/1004 340/539.26
2007/0262853 A1* 11/2007 Bradus ................ B60R 25/1004 340/426.25
2011/0012729 A1* 1/2011 Hess .................. G08B 13/1409 340/539.13
2013/0033373 A1 2/2013 Thomas
2014/0015664 A1 1/2014 Watsonb
2015/0130604 A1* 5/2015 Gomez Collazo ..... B60N 2/002 340/457

FOREIGN PATENT DOCUMENTS

WO 2006113734 A2 10/2006

* cited by examiner

*Primary Examiner* — Daniel Previl
(74) *Attorney, Agent, or Firm* — Kyle A. Fletcher, Esq.

(57) ABSTRACT

The vehicular child or pet alarm is an alarm system adapted for use with vehicles. The vehicular child or pet alarm is an in-vehicle sensor system that identifies when occupants, particularly children and pets, are in the vehicle. The sensor system is in communication with a key alarm and a case alarm. If sensor system detects an occupant within the vehicle and determines that either the key alarm or the case alarm are greater than a predetermined distance from the sensor system than an alarm is generated on the key alarm or the case alarm, respectively, and a text message is sent to a designated personal data device that is configured to receive text messages. The vehicular child or pet alarm comprises a sensor system, a key alarm, and a case alarm.

20 Claims, 4 Drawing Sheets

VEHICULAR CHILD OR PET ALARM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle fittings and electrical circuits specifically adapted for vehicles, more specifically, a sensor or alarm system for detecting people or animals left behind in a vehicle.

SUMMARY OF INVENTION

The vehicular child or pet alarm is an alarm system adapted for use with vehicles. The vehicular child or pet alarm is an in-vehicle sensor system that identifies when occupants, particularly children and pets, are in the vehicle. The sensor system further comprises a first GPS module that tracks the location of the sensor system, and by implication the vehicle. The sensor system is in communication with a key alarm and a case alarm. The key alarm is a key fob that further contains a second GPS module that tracks the location of the key alarm. If sensor system detects an occupant within the vehicle and a comparison of the first GPS module and the second GPS module indicates that the key alarm is more than a predetermined distance away from the vehicle an alarm is sounded on the key alarm and a text message is sent to a designated cellular phone. The case alarm is incorporated into the protective case of a personal data device that further contains a third GPS module. If sensor system detects an occupant within the vehicle and a comparison of the first GPS module and the third GPS module indicates that the case alarm is more than a predetermined distance away from the vehicle an alarm is sounded on the case alarm and a text message is sent to a designated personal data device that is configured to receive text messages.

These together with additional objects, features and advantages of the vehicular child or pet alarm will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular child or pet alarm in detail, it is to be understood that the vehicular child or pet alarm is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular child or pet alarm.

It is therefore important that the claims be regarded as including such equivalent construction insofar as they do not depart from the spirit and scope of the vehicular child or pet alarm. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
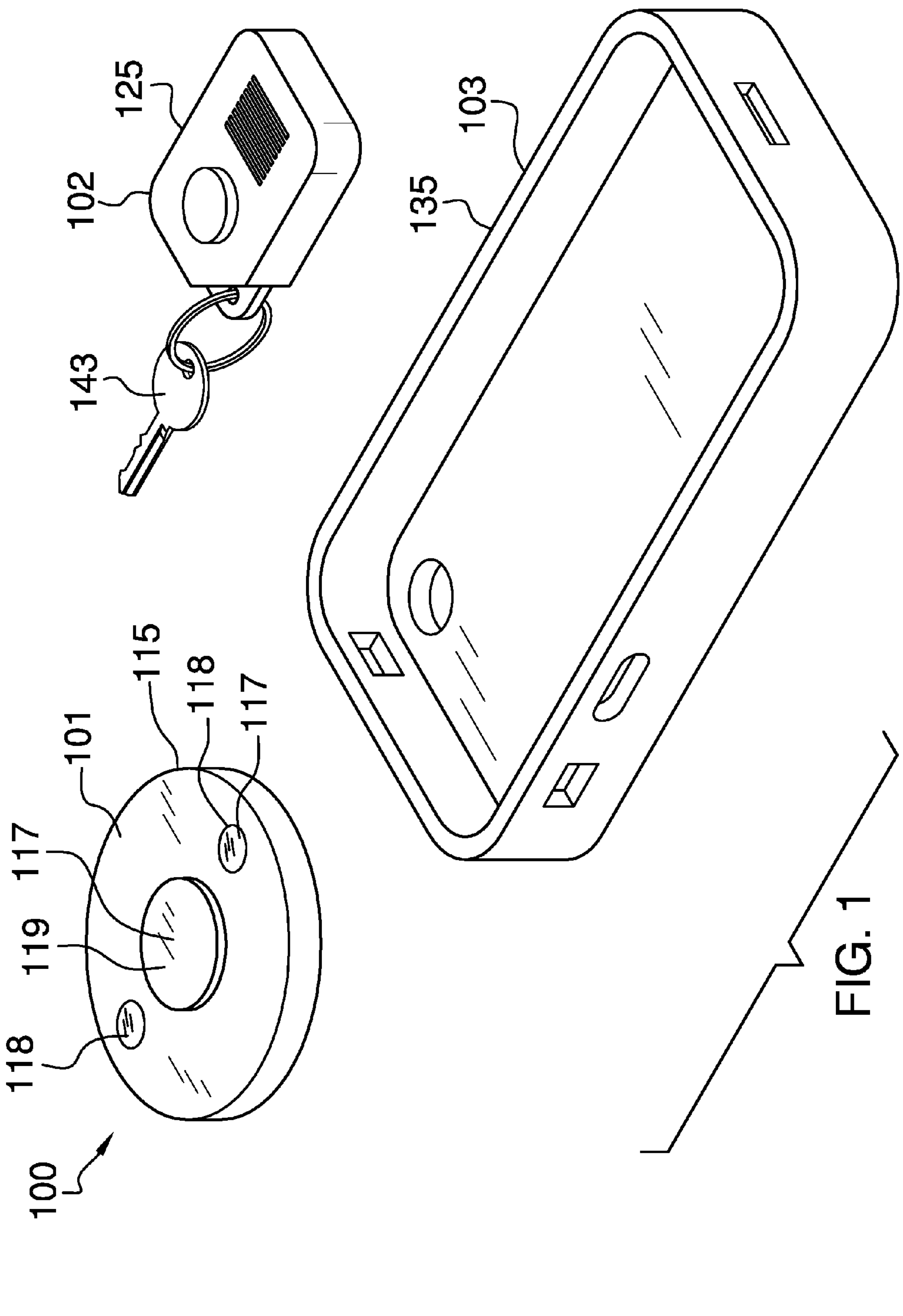
FIG. 1 is a perspective view of an embodiment of the disclosure.
Figure 2:
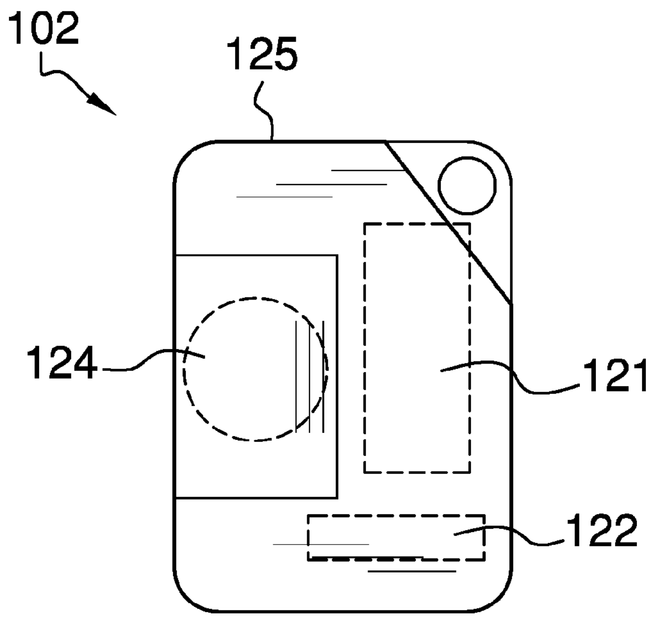
FIG. 2 is a detail view of an embodiment of the disclosure.
Figure 3:
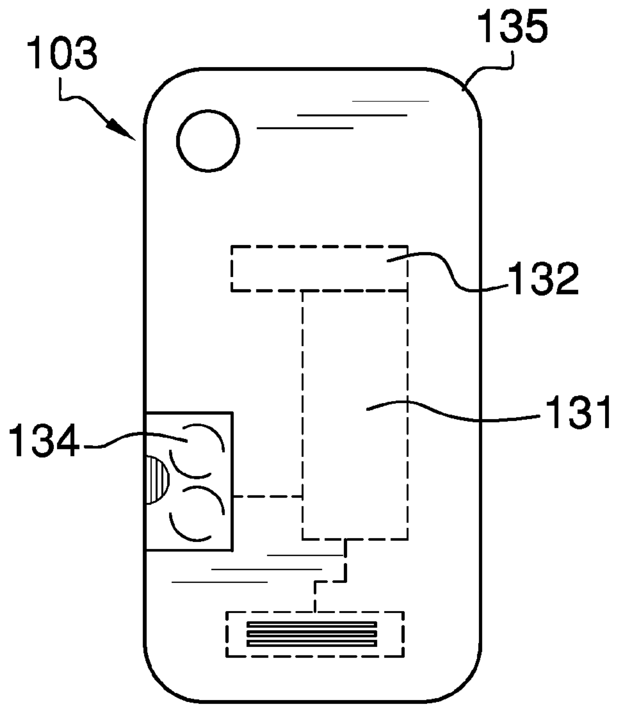
FIG. 3 is a detail view of an embodiment of the disclosure.
Figure 4:
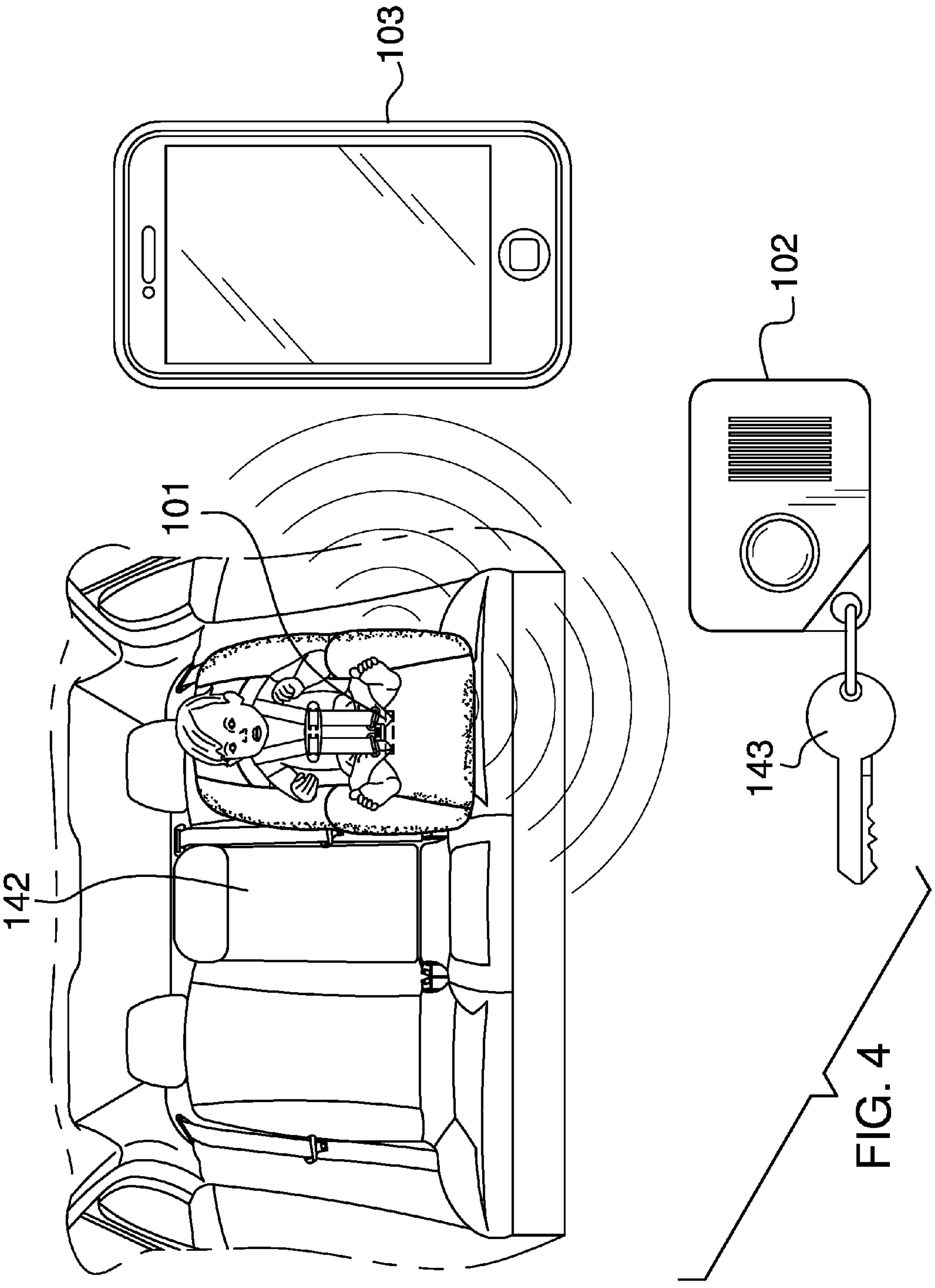
FIG. 4 is an in use view of an embodiment of the disclosure.
Figure 5:
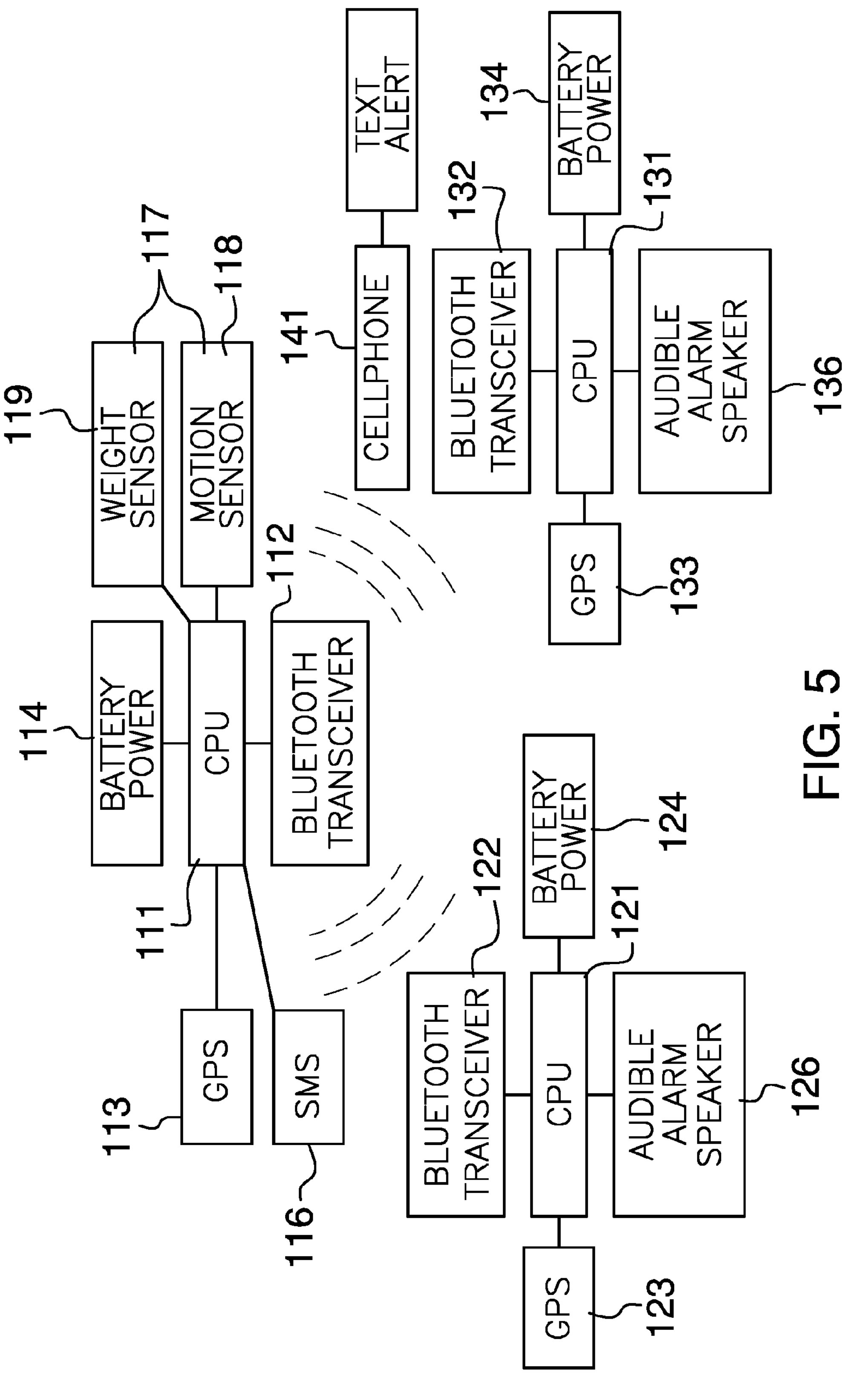
FIG. 5 is a block diagram of an embodiment of the disclosure.

Detailed reference will now be made to a first potential embodiment of the disclosure, which is illustrated in FIGS. 1 through 5.

The vehicular child or pet alarm 100 (hereinafter invention) comprises a sensor system 101, a key alarm 102, and a case alarm 103. The invention 100 is an alarm system adapted for use with vehicles 142. The invention 100 is further adapted for use with the SMS or text messaging systems. The invention 100 is an in-vehicle 142 sensor system 101 that senses when occupants, particularly children and pets, are in the vehicle 142. The sensor system 101 is in communication with the key alarm 102 and the case alarm 103. If sensor system 101 detects an occupant within the vehicle 142 and determines that either the key alarm 102 or the case alarm 103 are greater than a predetermined distance from the sensor system 101 than an alarm is generated on the key alarm 102 or the case alarm 103, respectively, and a text message is sent to a designated personal data device 141 that is configured to receive text messages.

The sensor system 101 further comprises a first logic module 111, a first Bluetooth transceiver 112, a first GPS module 113, a first power source 114, a first housing 115, an SMS module 116, and one or more occupant sensors 117. The first logic module 111 is a programmable device that is used to control and operate the sensor system 101. Depending on the specific design and the selected components, the first logic module 111 can be a separate component within the sensor system 101 or the functions of the first logic module 111 can be incorporated into another component within the sensor system 101. The first Bluetooth transceiver 112 is a radio frequency device that is used to manage Bluetooth communications initiated by the first logic module 111 between the sensor system 101 and the key alarm 102 and the sensor system 101 and the case alarm 103. The first GPS module 113 is an electrical device that communicates with the GPS to determine the GPS coordinates of the first GPS module 113. When queried by the first logic module 111, the first GPS module 113 transfers the GPS coordinates to the first logic module 111. The first power source 114 provides electrical power for the operation of the sensor system 101.

In the first potential embodiment of the disclosure, a battery is used as the first power source 114. Alternatively, the sensor system 101 can be wired directly into the electrical system of the vehicle 142. The SMS module 116 is an electrical device that is used to manage and communicate a predetermined text message to one or more predetermined personal data devices 141 using the cellular phone network. The transmission of the predetermined text messages is initiated by the first logic module 111. The one or more occupant sensors 117 are sensors that is designed to determine whether or not there is an occupant in the vehicle 142. Suitable sensors include, but are not limited to, weigh sensors, motion detectors, and thermal sensors. In the first potential embodiment of the disclosure, the one or more occupant sensors 117 further comprises a motion sensor 118 and a weight sensor 119. The first housing 115 is a rigid casing that is used to contain the sensor system 101. In the first potential embodiment of the disclosure, the one or more occupant sensors 117 further comprises a weight sensor 119 and a motion sensor 118. In the first potential embodiment of the disclosure, the first housing 115 is positioned such that the one or more occupant sensors 117 are able to sense weight or motion in the rear seat of the vehicle 142.

The key alarm 102 further comprises a second logic module 121, a second Bluetooth transreceiver 122, a second GPS module 123, a second power source 124, a second housing 125, and a key fob alarm speaker 126. The second logic module 121 is a programmable device that is used to control and operate the key alarm 102. Depending on the specific design and the selected components, the second logic module 121 can be a separate component within the sensor system 101 or the functions of the second logic module 121 can be incorporated into another component within the key alarm 102. The second Bluetooth transceiver 122 is a radio frequency device that is used to manage Bluetooth communications initiated by the second logic module 121 between the sensor system 101 and the key alarm 102. The second GPS module 123 is an electrical device that communicates with the GPS to determine the GPS coordinates of the second GPS module 123. When queried by the second logic module 121, the second GPS module 123 transfers the GPS coordinates to the second logic module 121. The second power source 124 provides electric power for the operation of the key alarm 102.

In the first potential embodiment of the disclosure, the second power source 124 is a battery. The second housing 125 is a readily and commercially available housing that is designed to be a key fob such that the second housing 125 can store the ignition key 143 to the vehicle 142. Key fobs are commercially available that can be further programmed to remotely operate the locks of the vehicle 142. The key fob alarm speaker 126 is a speaker that is used by the second logic module 121 to generate an audible alarm in situations where the sensor system 101 detects an occupant when the key alarm 102 is greater than a predetermined distance away from the vehicle 142. The minimum predetermined distance between the sensor system 101 and the key alarm 102 is 8 meters.

The case alarm 103 further comprises a third logic module 131, a third Bluetooth transreceiver 132, a third GPS module 133, a third power source 134, a third housing 135, and a case alarm speaker 136. The third logic module 131 is a programmable device that is used to control and operate the case alarm 103. Depending on the specific design and the selected components, the third logic module 131 can be a separate component within the sensor system 101 or the functions of the third logic module 131 can be incorporated into another component within the case alarm 103. The third Bluetooth transceiver 132 is a radio frequency device that is used to manage Bluetooth communications initiated by the third logic module 131 between the sensor system 101 and the case alarm 103. The third GPS module 133 is an electrical device that communicates with the GPS to determine the GPS coordinates of the third GPS module 133. When queried by the third logic module 131, the third GPS module 133 transfers the GPS coordinates to the third logic module 131. The third power source 134 provides electric power for the operation of the case alarm 103.

In the first potential embodiment of the disclosure, the third power source 134 is a battery. The third housing 135 is a readily and commercially available housing that is designed to be a protective case for a personal data device 141. Protective cases are commercially available. The case alarm speaker 136 is a speaker that is used by the third logic module 131 to generate an audible alarm in situations where the sensor system 101 detects an occupant while the case alarm 103 is greater than a predetermined distance away from the vehicle 142. The minimum predetermined distance between the sensor system 101 and the case alarm 103 is 8 meters.

The invention 100 is designed to operate and be used as described in this and the following two paragraphs. The sensor system 101 is installed in the vehicle 142 such that it can determine using the one or more occupant sensors 117 whether the vehicle 142 is occupied.

During operation, the sensor system 101 continuously polls the key alarm 102 to receive the GPS coordinates of the key alarm 102. The first logic module 111 compares the GPS coordinates received from the key alarm 102 and the GPS coordinates sensor system 101 to determine the distance between the key alarm 102 and the sensor system 101. If the distance between the key alarm 102 and the sensor system 101 is greater than the predetermined minimum distance and the sensor system 101 senses an occupant in the vehicle 142 the sensor system 101 indicates that a potentially unsafe condition may be occurring through the following actions: 1) the first logic module 111 initiates a signal to the key alarm 102 to sound an audible alarm sound through the key fob alarm speaker 126; and, 2) the first logic module 111 initiates the sending of a predetermined text message to one or more previously determined personal data devices 141 indicating that an unsafe condition may be occurring.

During operation, the sensor system 101 continuously polls the case alarm 103 to receive the GPS coordinates of the case alarm 103. The first logic module 111 compares the GPS coordinates received from the case alarm 103 and the GPS coordinates sensor system 101 to determine the distance between the case alarm 103 and the sensor system 101. If the distance between the case alarm 103 and the sensor system 101 is greater than the predetermined minimum distance and the sensor system 101 senses an occupant in the vehicle 142 the sensor system 101 indicates that a potentially unsafe condition may be occurring through the following actions: 1) the first logic module 111 initiates a signal to the case alarm 103 to sound an audible alarm sound through the case alarm speaker 136; and, 2) the first logic module 111 initiates the sending of a predetermined text message to one or more previously determined personal data devices 141 indicating that an unsafe condition may be occurring.

All the elements discussed in this disclosure are commercially available. Arduino compatible microcontroller and shield platforms are used to implement the first potential embodiment of the disclosure.

The following definitions were used in this disclosure:

Battery: As used in this disclosure, a battery is a container consisting of one or more cells, in which chemical energy is converted into electricity and used as a source of power.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Logic Module: As used in this disclosure, a logic module is a programmable device that accepts digital and analog inputs, processes the digital and analog inputs according to previously stored instruction and to provide the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

Sensor: As used in this disclosure, a sensor is a device that receives and responds in a predetermined way to a signal or stimulus.

Speaker: As used in this disclosure, the term a speaker is an electrical device that converts an electrical signal into an audible sound.

Transceiver: As used in this disclosure, a transceiver is a device that is used to transmit and receive radio signals.

Vehicle: As used in this disclosure, a vehicle is a motorized device that is used transporting carrying passengers, goods, or equipment over a system of roadways.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An alarm system comprising:

a sensor system, a key alarm, and a case alarm;

wherein the alarm system is adapted for use with vehicles;

wherein the alarm system is further adapted for use with a SMS or text messaging systems;

wherein the alarm system senses when occupants, are in a vehicle;

wherein the sensor system is in communication with the key alarm and the case alarm;

wherein if the sensor system detects an occupant within the vehicle and determines that the key alarm is greater than a predetermined distance from the sensor system than an alarm is generated on the key alarm and a text message is sent to a designated personal data device that receives text messages;

wherein if the sensor system detects an occupant within the vehicle and determines that the case alarm is greater than a predetermined distance from the sensor system than an alarm is generated on the case alarm and a text message is sent to a designated personal data device that receives text messages.

2. The alarm system according to claim 1 wherein the sensor system further comprises a first logic module, a first Bluetooth transceiver, a first GPS module, a first power source, a first housing, an SMS module, and one or more occupant sensors.

3. The alarm system according to claim 2 wherein the first logic module is a programmable device that is used to control and operate the sensor system.

4. The alarm system according to claim 3 wherein the first Bluetooth transceiver is a radio frequency device that is used to manage Bluetooth communications initiated by the first logic module between the sensor system and the key alarm and the sensor system and the case alarm.

5. The alarm system according to claim 4 wherein the first GPS module is an electrical device that communicates with the GPS to determine the GPS coordinates of the first GPS module.

6. The alarm system according to claim 4 wherein when queried by the first logic module, the first GPS module transfers the GPS coordinates of the first GPS module to the first logic module.

7. The alarm system according to claim 6 wherein the SMS module is an electrical device that is used to manage and communicate a predetermined text message to one or more predetermined personal data devices using the cellular phone network.

8. The alarm system according to claim 7 wherein the transmission of the predetermined text messages is initiated by the first logic module.

9. The alarm system according to claim 8 wherein the one or more occupant sensors are sensors that are designed to determine whether or not there is an occupant in the vehicle.

10. The alarm system according to claim 9 wherein the one or more occupant sensors further comprises a motion sensor and a weight sensor.

11. The alarm system according to claim 10 wherein the key alarm further comprises a second logic module, a second Bluetooth transreceiver, a second GPS module, a second power source, a second housing, and a key fob alarm speaker.

12. The alarm system according to claim 11 wherein the second logic module is a programmable device that is used to control and operate the key alarm;

wherein the second Bluetooth transceiver is a radio frequency device that is used to manage Bluetooth communications initiated by the second logic module between the key alarm and the key alarm.

13. The alarm system according to claim 12 wherein the second GPS module is an electrical device that communicates with the GPS to determine the GPS coordinates of the second GPS module;

wherein when queried by the sensor system, the key alarm transfers the GPS coordinates of the second GPS module to the sensor system.

14. The alarm system according to claim 13 wherein the key fob alarm speaker is a speaker that is used by the second logic module to generate an audible alarm.

15. The alarm system according to claim 14 wherein the case alarm further comprises a third logic module, a third Bluetooth transreceiver, a third GPS module, a third power source, a third housing, and a case alarm speaker.

16. The alarm system according to claim 15 wherein the third logic module is a programmable device that is used to control and operate the case alarm;

wherein the third Bluetooth transceiver is a radio frequency device that is used to manage Bluetooth communications initiated by the third logic module between the sensor system and the key alarm.

17. The alarm system according to claim 16 wherein the third GPS module is an electrical device that communicates with the GPS to determine the GPS coordinates of the third GPS module;

wherein when queried by the sensor system, the case alarm transfers the GPS coordinates of the third GPS module to the sensor system.

18. The alarm system according to claim 17 wherein the case alarm speaker is a speaker that is used by the third logic module to generate an audible alarm.

19. The alarm system according to claim 18 wherein the minimum predetermined distance between the sensor system and the key alarm is greater than eight meters.

20. The alarm system according to claim 19 wherein the minimum predetermined distance between the sensor system and the case alarm is greater than eight meters.

* * * * *